US008229079B2

(12) United States Patent
Tibbits

(10) Patent No.: US 8,229,079 B2
(45) Date of Patent: Jul. 24, 2012

(54) PROPAGATING USER STATUS INFORMATION ACROSS COMPUTING RESOURCES

(75) Inventor: Andrew Tibbits, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,638

(22) Filed: Sep. 30, 2011

(65) Prior Publication Data

US 2012/0147124 A1 Jun. 14, 2012

Related U.S. Application Data

(63) Continuation of application No. 12/963,451, filed on Dec. 8, 2010.

(51) Int. Cl.
*H04M 1/64* (2006.01)

(52) U.S. Cl. ..... 379/71; 370/352; 379/88.07; 379/88.11; 379/88.13; 379/88.16; 379/88.22; 455/413; 709/201; 709/224; 709/228

(58) Field of Classification Search .... 348/14.01–14.16; 370/259–271, 351–356; 379/67.1–88.28; 455/412.1–417; 709/201–207, 217–248
See application file for complete search history.

(56) References Cited

U.S. PATENT DOCUMENTS

| 5,434,908 | A * | 7/1995 | Klein | 379/88.23 |
| 5,832,062 | A * | 11/1998 | Drake | 379/88.16 |
| 6,266,399 | B1 * | 7/2001 | Weller et al. | 379/88.19 |
| 6,580,787 | B1 * | 6/2003 | Akhteruzzaman et al. | 379/88.22 |
| 6,622,021 | B1 * | 9/2003 | Takala | 455/466 |
| 6,631,183 | B1 * | 10/2003 | Rautila et al. | 379/88.22 |
| 6,658,095 | B1 * | 12/2003 | Yoakum et al. | 379/93.01 |
| 6,789,064 | B2 * | 9/2004 | Koh | 704/260 |
| 6,842,512 | B2 * | 1/2005 | Pedersen | 379/142.01 |

(Continued)

FOREIGN PATENT DOCUMENTS

WO 2006036356 A1 4/2006

OTHER PUBLICATIONS

Assigning a Temporary Greeting [online]. IPOffice Phone Manager: Voicemail > Using Personal Greetings. Last modified Jan. 24, 2008. Retrieved from the Internet: <- http://marketingtools.avaya.com/knowledgebase/user/ipoffice/mergedProjects/phonemanager/index.htm?temporarygreetings.htm> (2 pgs.).

(Continued)

*Primary Examiner* — Hemant Patel
(74) *Attorney, Agent, or Firm* — Shumaker & Sieffert, P.A.

(57) ABSTRACT

The subject matter of this disclosure can be implemented in, among other things, a device that includes processors, means for receiving a voicemail greeting template having a default portion and a placeholder portion, wherein the default portion is included in voicemail greetings generated based on the voicemail greeting template, and a user status propagation module executable by the one or more processors. In these examples, the user status propagation module receives status information for a user or a device, wherein the status information includes a state of the user or a state of the device, and replaces the placeholder portion of the voicemail greeting template with the received status information to generate a personalized voicemail greeting of the user that includes the default portion and the received status information, wherein output of the personalized voicemail greeting is initiated in response to an incoming phone call.

17 Claims, 4 Drawing Sheets

U.S. PATENT DOCUMENTS

| | | | |
|---|---|---|---|
| 7,142,656 B2* | 11/2006 | Moody et al. | 379/207.16 |
| 7,224,966 B2 | 5/2007 | Caspi et al. | |
| 7,295,662 B2* | 11/2007 | Vitikainen et al. | 379/207.02 |
| 7,382,868 B2 | 6/2008 | Moore et al. | |
| 7,769,154 B1* | 8/2010 | Craft et al. | 379/207.12 |
| 2002/0186257 A1 | 12/2002 | Cadiz et al. | |
| 2003/0073430 A1 | 4/2003 | Robertson et al. | |
| 2003/0123620 A1* | 7/2003 | Matsuyama | 379/88.13 |
| 2004/0143841 A1* | 7/2004 | Wang et al. | 725/32 |
| 2004/0156484 A1 | 8/2004 | Amin | |
| 2005/0037741 A1 | 2/2005 | Gilbert | |
| 2006/0031326 A1* | 2/2006 | Ovenden | 709/206 |
| 2006/0117087 A1 | 6/2006 | Demsky et al. | |
| 2006/0140361 A1 | 6/2006 | Heikes et al. | |
| 2006/0148499 A1 | 7/2006 | Chie | |
| 2006/0234735 A1 | 10/2006 | Digate et al. | |
| 2006/0277256 A1 | 12/2006 | Tiruthani et al. | |
| 2007/0003028 A1* | 1/2007 | Korah et al. | 379/88.14 |
| 2007/0153768 A1 | 7/2007 | Jagadesan et al. | |
| 2008/0285588 A1 | 11/2008 | Balk et al. | |
| 2009/0063676 A1* | 3/2009 | Oh et al. | 709/224 |
| 2009/0067593 A1* | 3/2009 | Ahlin | 379/88.22 |
| 2009/0300525 A1 | 12/2009 | Jolliff et al. | |
| 2010/0144377 A1 | 6/2010 | Alakontiola | |
| 2010/0159890 A1* | 6/2010 | Sigmund et al. | 455/413 |
| 2010/0215157 A1* | 8/2010 | Narayan et al. | 379/88.19 |
| 2010/0273443 A1* | 10/2010 | Forutanpour et al. | 455/404.1 |

OTHER PUBLICATIONS

FAQ—Setup Voice Mail for Vacation [online]. "How Do I Setup Voice Mail for Vacation?" UNI User Services. Last reviewed: Jul. 30, 2003. Retrieved from the Internet: <http://www.uni.edu/its/us/faqs/vacavoice.htm> (2 pgs.).

0002360:[patch] Add temporary greetings to voicemail—Asterisk.org Issue Tracker [online]. Last updated: Jan. 15, 2008. Retrieved from the Internet: <https://issues.asterisk.org/view.php?id=2360> (6 pgs.).

U.S. Appl. No. 12/963,451, by Andrew Tibbits, filed Dec. 8, 2010.
U.S. Appl. No. 12/963,408, by Marcus Foster, filed Dec. 8, 2010.
U.S. Appl. No. 13/250,657, by Marcus Foster, filed Sep. 30, 2011.
U.S. Appl. No. 11/173,670, by Roderick Chavez, filed Jun. 30, 2005.
International Search Report and Written Opinion of international application No. PCT/US2011/063779, dated Mar. 30, 2012, 11 pp.

* cited by examiner

PROPAGATING USER STATUS INFORMATION ACROSS COMPUTING RESOURCES

This application is a continuation of U.S. application Ser. No. 12/963,451, filed Dec. 8, 2010, the entire contents of which is incorporated herein by reference.

TECHNICAL FIELD

The disclosure relates to managing information across computing resources using a computing device, such as a personal computer, tablet computer, or cellular telephone.

BACKGROUND

Conventionally, voicemail messages are difficult to change and provide a limited amount of information. For example, when entering a meeting for an hour, or going water skiing, a user knows in advance that he/she will not be able to answer his phone, but has no easy way of letting callers know why he/she didn't answer when they call. The user could manually change the greeting, but this process is often very slow and provides limited functionality. Furthermore, if the user needs to change his status in multiple different locations, e.g., on multiple different status information providers, the user typically needs to interact with each status information provider's user interface and set his status for each status information provider individually.

SUMMARY

In general, the techniques of this disclosure describe techniques for allowing a user to quickly manage his/her voicemail greeting when the user knows he/she will be unable to answer his phone by, for example, providing an interface for the user to record a quick away message or select from a set of prerecorded messages to say why the user cannot answer the phone. The techniques may include an interface that may combine managing a voicemail greeting with managing real-time status updates, such as a Google Buzz message, a Facebook® status message, an instant messaging status, or similar. The interface may include a mobile device application, e.g., a smart phone application, a website. The mobile device application may provide a subset of the features available to a user via the website in order to provide faster and easier voicemail greeting and status update management.

In one example, a method includes receiving a voicemail greeting template having a default portion and a placeholder portion, wherein the default portion is included in voicemail greetings generated based on the voicemail greeting template. The method also includes receiving status information for a user or a device, wherein the status information includes a state of the user or a state of the device, and replacing the placeholder portion of the voicemail greeting template with the received status information to generate a personalized voicemail greeting of the user, wherein output of the personalized voicemail greeting is initiated in response to an incoming phone call.

In another example, a computer-readable storage medium is encoded with instructions for causing one or more programmable processors to receive a voicemail greeting template having a default portion and a placeholder portion, wherein the default portion is included in voicemail greetings generated based on the voicemail greeting template. The instructions further cause the one or more programmable processors to receive status information for a user or a device, wherein the status information includes a state of the user or a state of the device, and replace the placeholder portion of the voicemail greeting template with the received status information to generate a personalized voicemail greeting of the user, wherein output of the personalized voicemail greeting is initiated in response to an incoming phone call.

In another example, a device includes one or more programmable processors, means for receiving a voicemail greeting template having a default portion and a placeholder portion, wherein the default portion is included in voicemail greetings generated based on the voicemail greeting template, and a user status propagation module executable by the one or more programmable processors. The user status propagation module may be configured to receive status information for a user or a device, wherein the status information includes a state of the user or a state of the device, and replace the placeholder portion of the voicemail greeting template with the received status information to generate a personalized voicemail greeting of the user, wherein output of the personalized voicemail greeting is initiated in response to an incoming phone call.

In another example, a method comprises receiving status update information associated with the computing device or a user of the computing device, wherein the status information includes a state of the computing device or a state of the user, and determining a voicemail greeting based on the status update information, wherein output of the voicemail greeting is initiated in response to a missed incoming phone call. The method further comprises determining one or more personalized text-based status update messages based on the status update information wherein each of the personalized text-based status update messages corresponds to a status update service provider, wherein the status update service provider maintains user status information for a group of users, and propagating each of the personalized text-based status messages to the corresponding status update service provider.

The techniques of this disclosure may provide one or more advantages. For example, the techniques of this disclosure may provide a simplified mechanism for updating various audio or text-based status update services. In accordance with the techniques of this disclosure, a user may select a desired voicemail greeting from a set of pre-recorded voicemail greetings that may correspond to a particular pre-configured text-based status. The user, in some instances, may also record a custom recorded voicemail greeting, which is converted to a text-based status using speech recognition techniques. The techniques may also provide a single interface for updating and managing voicemail greeting messages and text-based status messages. Thus, the techniques of this disclosure may enable voicemail greeting messages to be as dynamically and easily updated as text-based status update messages.

The details of one or more embodiments of this disclosure are set forth in the accompanying drawings and the description below. Other features, objects, and advantages of this disclosure will be apparent from the description and drawings, and from the claims.

BRIEF DESCRIPTION OF DRAWINGS

Like reference symbols in the various drawings indicate like elements.

DETAILED DESCRIPTION

Figure 1:
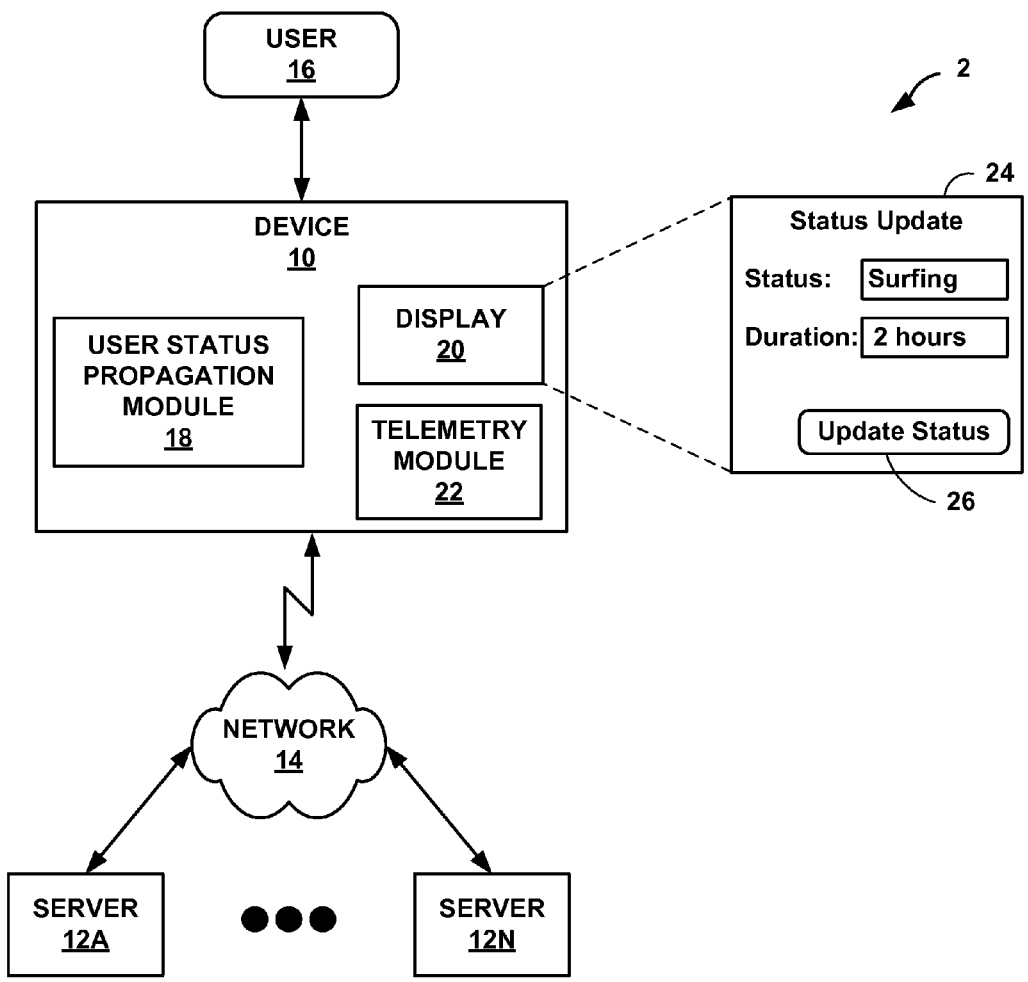
FIG. 1 is a conceptual diagram illustrating one example networked computing environment with an example user interface displayed, in accordance with one aspect of the present disclosure.

FIG. 1 is a conceptual diagram illustrating one example networked computing environment with an example user interface 24 displayed, in accordance with one aspect of the present disclosure. As shown in FIG. 1, computing system 2 includes device 10, one or more servers 12A-12N ("servers 12"), and network 14. Examples of device 10 include, but are not limited to, portable or mobile devices such as cellular phones, personal digital assistants (PDAs), laptop computers, tablet computers, portable gaming devices, portable media players, e-book readers, watches, as well as non-portable devices such as desktop computers. For purposes of illustration only in this disclosure, device 10 is described as a portable or mobile device that a user can carry, but aspects of this disclosure should not be considered limited to portable or mobile devices.

Device 10 and servers 12 are coupled to network 14 via wired and/or wireless links. Device 10 may send data to or receive data from servers 12 via network 14. Network 14 may include a wide-area network such as the Internet, a local-area network (LAN), an enterprise network, a wireless network, a cellular network, or one or more other types of networks. Servers 12 may be any of several different types of network devices. For instance, servers 12 may be conventional web servers, specialized media servers, personal computers operating in a peer-to-peer fashion, or other types of network devices. In some examples, one or more of servers 12 may be provided by status update service providers, such as Google™ or Facebook®, which maintain user status information for one or more users (e.g., user 16). Servers 12 may host instant messaging services (e.g., Google Chat or Yahoo! Messenger), social networking services (e.g., Google Buzz™ or Facebook®), voice services (e.g., Google Voice™), or other services that may include status information for user 16.

Device 10 may include a user status propagation module 18, a display 20, and a telemetry module 22. Display 20 may be a liquid crystal display (LCD), e-ink, or other display. Display 20 presents the content of device 10 to user 16. For example, display 20 may present the applications executed on device 10 such as a web browser or a video game, content retrieved from servers 12, and other functions that may need to be presented to user 16. As another example, display 20 may be a touch screen that allows user 16 to interact with device 10. Although device 10 is shown as including display 20, aspects of this disclosure should not be considered limited to examples that include display 20. In some examples of device 10, display 20 may be optional.

In some examples, any application executed on device 10 may require data from one or more of servers 12. Telemetry module 22 transmits a request for the data and receives the data from one or more of servers 12. Telemetry module 22 may provide the received data to device 10 for further processing. Telemetry module 22 is configured to transmit data/requests to and receive data/responses from one or more servers 12 via network 14. Telemetry module 22 may support wireless or wired communication, and includes appropriate hardware and software to provide wireless or wired communication. For example, telemetry module 22 may include an antenna, modulators, demodulators, amplifiers, and other circuitry to effectuate communication between device 10 and one or more of servers 12.

In general, user status propagation module 18 provides an interface that may combine managing a voicemail greeting with managing real-time user status updates. A voicemail greeting is typically outputted to a caller in response to an incoming call and provides the caller with information, such as status information, regarding user 16. In some examples, user status propagation module 18 may receive user status information from user 16 via user interface 24. For example, user 16 may interact with user interface 24 displayed on display 20 to input user status information. In some examples, user 16 may select from a set of preconfigured status messages or input a custom status message when inputting the user status information. User 16 may also specify a duration for which user 16 would like the status to be the user's current status. Upon expiration of the specified duration of time, the status information for user 16 may revert to a default user status or other user status as specified by user 16.

In the example shown in FIG. 1, user 16 set the status to "surfing" and the duration for the status to "2 hours." After setting the status information, user 16 may submit the status information to user status propagation module 18 using, for example, the update status button 26 displayed on user interface 24. User status propagation module 18 receives the status information and updates the user status information for one or more applications or voicemail greetings associated with user 16. When updating voicemail greetings or other audible sources of status information, user status propagation module 18 may before text-to-speech functionality to generate the audible status information based on the text-based user status information entered by user 16.

In other examples, user 16 may enter user status information by, for example, speaking the desired status information. Device 10 may record the spoken status information using an audio input device (not shown in FIG. 1). While described as recording spoken status information, device 10 may record any type of audio and should not be construed as being limited to recording spoken status information. User status propagation module 18 may perform speech-to-text functionality to convert the spoken status information into text-based status information, which may be used to update various services that utilize text-based status information. User 16 may cause device 10 to record the spoken status information by, for example, pressing and holding a button. Device 10 may be configured to record audio while the button is pressed. Upon user 16 releasing the button, user status propagation module 18 may perform the text-to-speech functionality.

Upon receiving the user status information, user status propagation module 18 may issue one or more commands to servers 12 to cause servers 12 to update status information associated with user 16 based on the received user status information. In one example, server 12A hosts instant messaging services, such as Google Chat services. In this example, user status propagation module 18 issues a command to server 12A that includes the status information received from user 16 in a text format. Server 12A receives the command and updates the use status of the instant messaging account associated with user 16 based on the command. In another example, server 12N hosts voice services, such as Google Voice. In this example, user status propagation module 18 issues a command to server 12N that includes the status information received from user 16 in an audio format. Server 12N receives the command an updates a voicemail greeting for user 16 based on the audio status information included in the command received from user status propagation module 18.

In this manner, user 16 may quickly manage his/her voicemail greeting and text-based user status information associated with one or more services, such as Google Voice™ and Google Chat, when user 16 knows he/she will be unavailable by, for example, providing a user interface 24 for user 16 to record a quick away message or select from a set of prerecorded messages to say why user 16 is unavailable. Upon entering or recording the status information, user status propagation module 18 further facilitates updating and management of the status information by, for example, propagating the user status information to multiple services associated with user 16.

Figure 2:
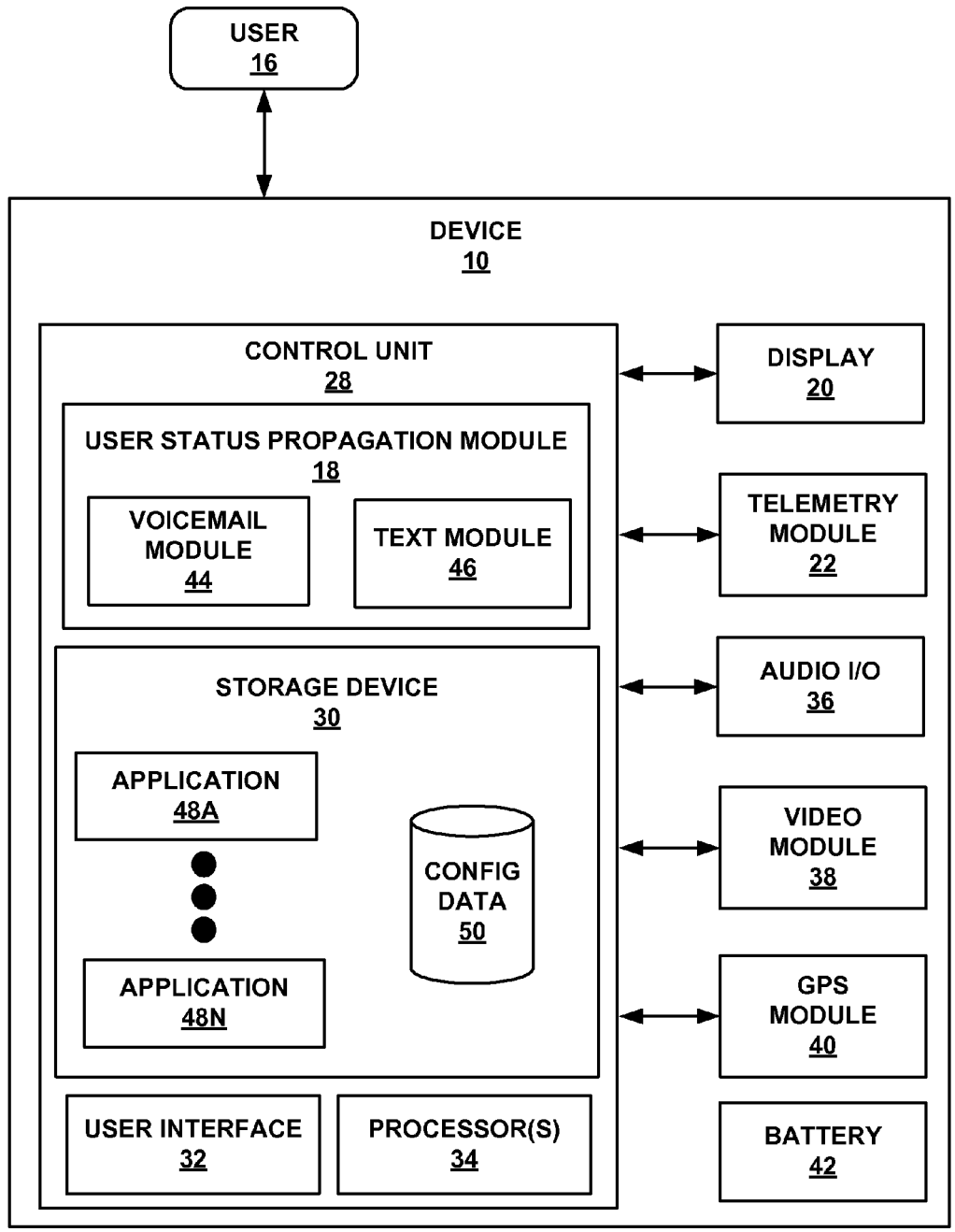
FIG. 2 is a block diagram illustrating an example client device, in accordance with one aspect of the present disclosure.

FIG. 2 is a block diagram illustrating an example client device, in accordance with one aspect of the present disclosure. As shown in FIG. 2, device 10 may include control unit 28, audio input/output (AUDIO I/O) 36, video module 38, global positioning system ("GPS") module 40, and battery 42. Audio I/O 36 may record audio from one or more sources such as a microphone and output audio using one or more sources such as a speaker. Video module 38 may record video information received via a video camera and output video information via display 20, for example. GPS module 40 may determine the physical location of device 10 and provide coordinates for the location. In some examples, GPS module 40 may provide coordinates in response to a request initiated by user 16 or by one of applications 48. Battery 42 provides power for all the various units of device 10, and may be rechargeable. Examples of battery 42 include a lithium polymer battery, a lithium ion battery, nickel cadmium battery, and a nickel metal hydride battery.

Control unit 28 may provide an operating environment for executing user status propagation module 18, user interface 32, one or more processors 34, and various applications 48A-48N (collectively, "applications 48") that may be stored within storage device 30 and executed by processors 34. Storage device 30 may comprise a computer-readable storage media such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 28 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In general, control unit 28 provides an operating environment for executing one or more of applications 48 either alone or simultaneously. Examples of applications 48 include web browsers, e-mail, programs to retrieve stock quotes, programs to search for restaurants, programs that retrieve current and future weather information, games, programs that play audio and/or video files, programs to search the Internet, programs that provide news, programs that provide maps, and other programs. Applications 48 may be executed based on a request from user 16 (FIG. 1), and may be terminated based on a request from user 16. Some applications 48 may be running continuously in the background. Some applications 48 may be executed automatically by device 10 such as at power up and may be terminated automatically by device 10 such as at power down. For purposes of illustration only in the following description, the applications that may be executed by one or more processors 34 are described below as being executed by one processor 34. The applications may be downloaded by user 16 via network 14 (e.g., from one or more of servers 12) or may be preprogrammed within device 10.

User 16 may interact with user interface 32 and/or display 20 to execute one or more of applications 48 stored on storage device 30. In some examples, user interface 32 may include web-based interface for managing user status information. The web-based interface may provide a complete set of configuration options and features available to user 16. In other examples, user interface 32 may include a mobile application (e.g., one of applications 48) that executes within device 10 and may provide a subset of the configuration options and features of the web-based interface. The mobile application interface may, in various instances, enable user 16 to modify user status information in fewer steps or with fewer interactions with the mobile application interface as compared to the number of steps or interactions required to modify user status information using the web-based interface.

In response to user input, processor 34 executes the one or more applications selected by user 16, or executes the one or more applications executed by device 10. Processor 34 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to processor 34, in this disclosure, may be embodied as software, firmware, hardware or any combination thereof.

As one example of applications 48, storage device 30 may store application instructions associated with the Google Voice™ application, e.g., application 48A. User 16 may interact with user interface 32 and/or display 20 to execute the Google Voice™ application. Processor 34 then executes the Google Voice™ application and causes display 20 to display the application to user 16. User 16 may then interact with user interface 32 and/or display 20 to review voicemail messages, record voicemail greetings, or send a text message to another person. In one example, the voicemail information is stored on one or more of servers 12 of FIG. 1. In this example, telemetry module 22 transmits a request to one or more of servers 12, via network 14, for the requested website. Display 20 then presents the received content to user 16.

User status propagation module 18 may include voicemail module 44 and text module 46. Voicemail module 44 may be configured to issue a command to one or more voicemail systems or other audio-based status information sources that cause the voicemail system to update a voicemail greeting for user 16 based on user status information received from user 16 via user interface 32 and/or display 20. In some examples, voicemail module 44 performs text-to-speech techniques to convert text-based status update information into audio status update information that may be used in a voicemail greeting. Text module 46 may be configured to issue a command to one or more social network, instant messaging, or other text-based status information sources that cause the text-based status information sources to update a text-based status for user 16 based on the user status information received from user 16 via user interface 30 and/or display 20. Text module 46 may perform speech-to-text techniques to convert audio-based user status information into text-based user status information.

In one example user 16 interacts with user interface 32 to set the voicemail greeting by selecting one of a set of prerecorded voicemail greetings or by recording a custom voicemail greeting. Each pre-recorded greeting may correspond to a particular pre-configured text-based status for user 16. When user 16 changes the voicemail greeting, user status propagation module 18 may also cause one or more text-based statuses for user 16 to be updated based upon the selected voicemail greeting. When user 16 records a custom voicemail greeting, text module 46 may perform speech-to-text techniques in order to translate the custom greeting into a text-based status for user 16. In another example, user 16 changes a voicemail greeting by entering a text-based status update via user interface 32 and/or display 20 and directs user status propagation module 18 to generate a voicemail greeting based on the status update. Voicemail module 44 may perform text-to-speech techniques to translate the text-based status update into a voicemail greeting.

In other examples, user 16 may combine a permanent message with a temporary message. For example, in the voicemail greeting template "Hello, my name is User. I am <status goes here>," user status propagation module 18 may replace the placeholder portion of the message (e.g., "status goes here") with a status set by user 16 via user interface 32 and/or display 20. User 16 may set his status either by recording a temporary status message via audio input 36 or by entering a text-based status via user interface 32 and/or display 20. If user 16 inputs a status of "rock climbing for the next two hours," the voicemail greeting may be set to "Hello, my name is User. I am rock climbing for the next two hours." That is, user status propagation module 18 replaces the placeholder portion of the voicemail greeting template with the received status information to generate a personalized voicemail greeting of the user.

User status propagation module 18 may also be configured to interpret "for the next two hours" as the duration for which the voicemail greeting should be set as the active voicemail greeting. In this example, user status propagation module 18 causes the voicemail system to revert to a default voicemail greeting or some other voicemail greeting as configured by user 16 two hours after the temporary message was set as the active status. Of course, user 16 may change the voicemail greeting at any time prior to the expiration of the current greeting.

In another example, user status propagation module 18 may be configured to replace two different placeholder sub-portions of a voicemail greeting template with status information received from user 16. For example, a user placeholder sub-portion of a voicemail greeting template may be replaced with a name of user 16 included in the status information received from user 16 and the state portion of the status information. Similarly, a state placeholder sub-portion of the voicemail greeting template may be replaced with state information included in the status information received from user 16. In the example where the voicemail greeting template is "Hello, my name is <name>. I am <status goes here>," user status propagation module 18 may replace the name placeholder sub-portion (e.g, "<name>") with the name of user 16 (e.g., "User") and the state placeholder sub-portion (e.g., "<status goes here") with the state of user 16 (e.g., "rock climbing for the next two hours").

In various instances, user status propagation module 18 may propagate the user status information to specific individuals, such as contacts in an address book. For example, if user 16 configures the voicemail greeting to indicate that user 16 is away for the next two hours, user status propagation module 18 may directly or indirectly notify one or more individuals of the user's status. As one example, if a contact in the user's address book attempts to call user 16 while user 16 is away, the contact will be prompted that user 16 is away prior to calling user 16. The contact may be prompted that user 16 is away by including an indication of the user's status in the user's contact information or by prompting the contact upon the contact attempting to call user 16, as examples.

As another example, user 16 may record audio/video status information using video module 38 and audio I/O 36 of device 10. The audio/video status information may be propagated as user status information to various status update service providers, such as video chat applications. When recording audio/video status information, user status propagation module 18 may perform text-to-speech functionality as described above with respect to the audio portion of the status information to convert and propagate text-bases status information. The audio portion of the audio/video status information may also be extracted by user status propagation module 18 to, for example, update the voicemail away message for user 16.

In examples where device 10 does not include display 20, user 16 may call a specified phone number or use a different device to cause a service that includes a voicemail greeting (e.g., Google Voice) to call device 10. In these examples, user status propagation module 18 may not be included within device 10. Rather, a user status propagation module similar to user status propagation module 18 may reside on a server that hosts the voicemail service (e.g., server 12A of FIG. 1). When user 16 updates the user status information via a phone call, user 16 may speak the user status information and duration information, if any. The user status propagation module that resides on the server may be configured to receive the spoken user status information, perform speech-to-text techniques, if needed, and update the user's voicemail greeting as well as any text-based user status services configured by user 16.

In accordance with one aspect of the disclosure, user status propagation module 18 may automatically generate user status information and automatically propagate the generated user status information, if so configured by user 16. For example, user status propagation module 18 may receive charge level information from battery 42 and may automatically generate user status information based on the charge level information. If the charge level information indicates the battery is close to running out of power, user status propagation module 18 may generate user status information indicating that device 10 is nearly out of power and include alternate methods of reaching user 16 (e.g., calling a different phone number).

In other examples, device 10 may include a calendar application (e.g., one of applications 48) or may exchange information with a calendar application hosted by one of servers 12 of FIG. 1. User status propagation module 18 may receive information from the calendar application indicating a time and date of a scheduled event and may update user status information based on the scheduled event. When user 16 schedules the event, user 16 may be provided the option to record audio status information, input text status information, or select a prerecorded message as the user's status information.

User status propagation module 18 may be configured to detect an event type associated with the event based on information about the event, such as the calendar in which the event is schedule, the name of the event, or a category assigned to the event. In some examples, user 16 may assign a particular user status for each event type. In these examples, user status propagation module 18 may associate the detected event type with the configured user status information and update the user status information with the associated user status information. In other examples, user status propagation module 18 may utilize the name of the calendar in which the event is scheduled, the name of the event, or the category assigned to the event as the user status information. In an example where a voicemail greeting includes a template having placeholder information that is replaced by user status information, user status propagation module 18 may update the placeholder information with the user status information while leaving the remaining portions of the voicemail greeting unaltered.

User status propagation module 18 may also provide user 16 with the ability to direct incoming calls to particular voicemail greetings based on real-time user input or based on the caller ID information associated with the incoming call, for example. In various instances, user 16 may direct certain incoming calls directly to voicemail prior to the user's phone ringing while allowing other incoming calls to ring the user's phone. Similarly, user status propagation module 18 may utilize the caller ID information to provide additional information to particular callers, such as providing select callers with a GPS location as determined by GPS module 40 of device 10. The specificity of the information provided to the callers may be defined based on the caller ID information. For example, if the caller is a close friend, user 16 may configure user status propagation module 18 to provide the exact GPS coordinates of the user's current location to the caller. However, if the caller is another individual, user 16 may only provide general city and state information to the caller or provide no location information at all. User status propagation module 18 may also utilize the caller ID information to provide select callers additional details about the user's status, such as the date and time an away message will expire, when the user will next be available, or the user's geographic location.

In general, user 16 may configure user status propagation module 18 using user interface 32 and/or display 20. Configuration parameters entered by user 16 may be stored within configuration data ("CONFIG DATA") 50 of storage device 30. Configuration data 50 may be stored in the form of one or more tables, databases, linked lists, radix trees, or other suitable data structure. User 16 may configure various aspects of user status propagation module 18. For example, user 16 may configure a default user status that is applied upon the expiration of limited duration user status information, a selection of available configured or pre-recorded user status messages, user account information associated with one or more services that may receive user status information updates, which text-based and audio-based services to include when updating user status information, and which callers receive what level of user status information, among other configurable options. As other examples, user 16 may configure user status propagation module 18 to have all calls go directly to voicemail without indicating an incoming caller via audio output 38 (e.g., ringing the phone) or display 20 (e.g., showing an incoming call) whenever user 16 sets the user status information to "away" or an equivalent status. User 16 may also configure user status propagation module 18 to notify selected friends of the current user status information prior to any of the selected friends calling user 16.

Figure 3:
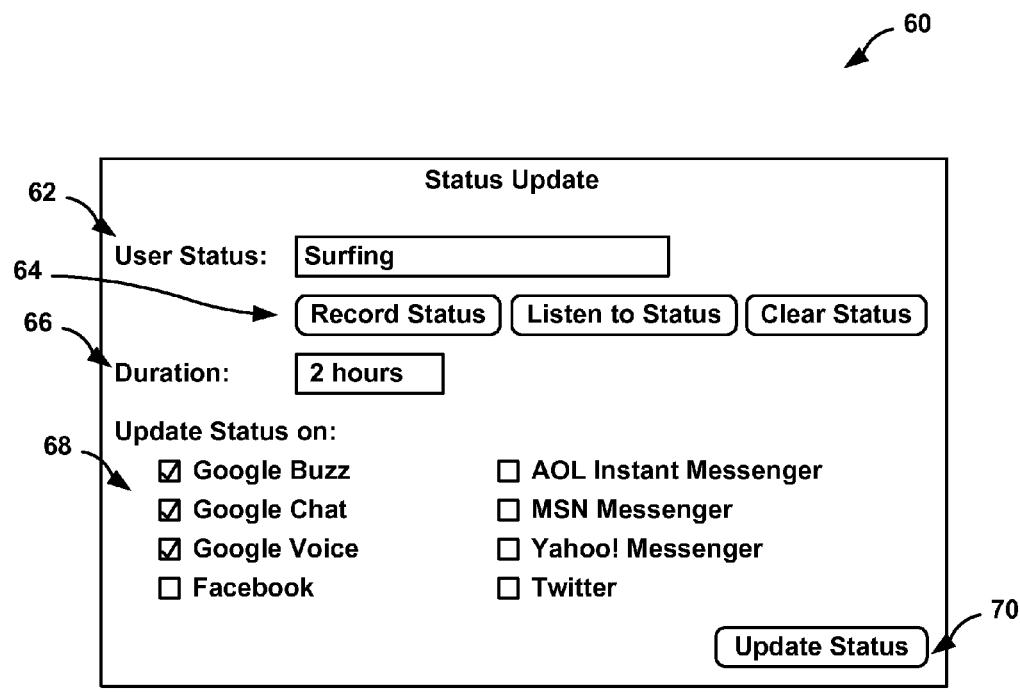
FIG. 3 is a screen illustrating an example user interface for updating the status of a user, in accordance with one aspect of the present disclosure.

FIG. 3 is a screen illustration of an example user interface for updating the status of a user, in accordance with one aspect of the present disclosure. For purposes of illustration, the example user interface is described below within the context of the example computing system 2 of FIG. 1 and may be generated by user interface 32 of device 10.

As illustrated in FIG. 3, user interface 60 includes user status field 62, user status buttons 64, duration field 66, service selection check boxes 68, and update status button 70. User status field 62 may include a drop-down list of preconfigured user status messages or voicemail greetings. In some examples, user status field 62 combines a drop-down list and a text entry field. For example, a template voicemail greeting may include placeholder information that is replaced by user status information entered by user 16. In this example, the template voicemail greeting may be selected from the drop-down list and the placeholder information may be replaced by the user status information entered by user 16 in the text entry field. In other examples, user status field 62 is a text entry field, but does not include a drop-down list of preconfigured user status messages or voicemail greetings.

User 16 may interact with user status buttons 64 to clear an existing status (e.g., to revert the user status information to a default user status), listen to a recorded audio user status information (e.g., via audio output 38 of device 10), or record a new audio user status information (e.g., via audio input 36 of device 10). In some examples, device 10 may display a text version of the recorded audio user status information in user status field 62. User 16 may then edit the text version within user status field 62, clear the recorded, or record new user status information, as desired, via the user status buttons 64.

If user 16 would like to limit the duration for which the entered user status information remains the active user status information, user 16 may enter duration information in duration field 66. When user 16 enters duration information, the user status information may expire at the end of the specified duration and a default user status or other user status, as configured by user 16, may become the current user status. Alternatively, or in addition, user 16 may enter a date and time at which the entered user status information will expire. Upon the expiration of the specified time duration or at the specified expiration time, each service identified with the service selection check boxes 68, including voicemail and text-based services, will be issued a command to update the user status information maintained by each service.

Service selection check boxes 68 may include a default set of services, a configured set of services where each service includes user account information or other information required to update the user status information for each service, or other services as selected by user 16. When updating user status information, user 16 may select a subset of all configured services to which the updated user status information is to be propagated by user status propagation module 18. By selecting a subset of services, user 16 may specify different user status information for each different service or combination of services. For example, user 16 may set the user status information for Google Buzz™, Google Chat, and Google Voice™ to "surfing" and then set the user status information for Facebook®, AOL Instant Messenger (AIM®), and Yahoo! Messenger to "away."

Upon entering the desired user status information and selecting the desired services to which to propagate the user status information, user 16 may then click, tap, touch or otherwise interact with update status button 70 to cause the information specified in user interface 60 to be submitted to user status propagation module 18 for processing.

Figure 4:
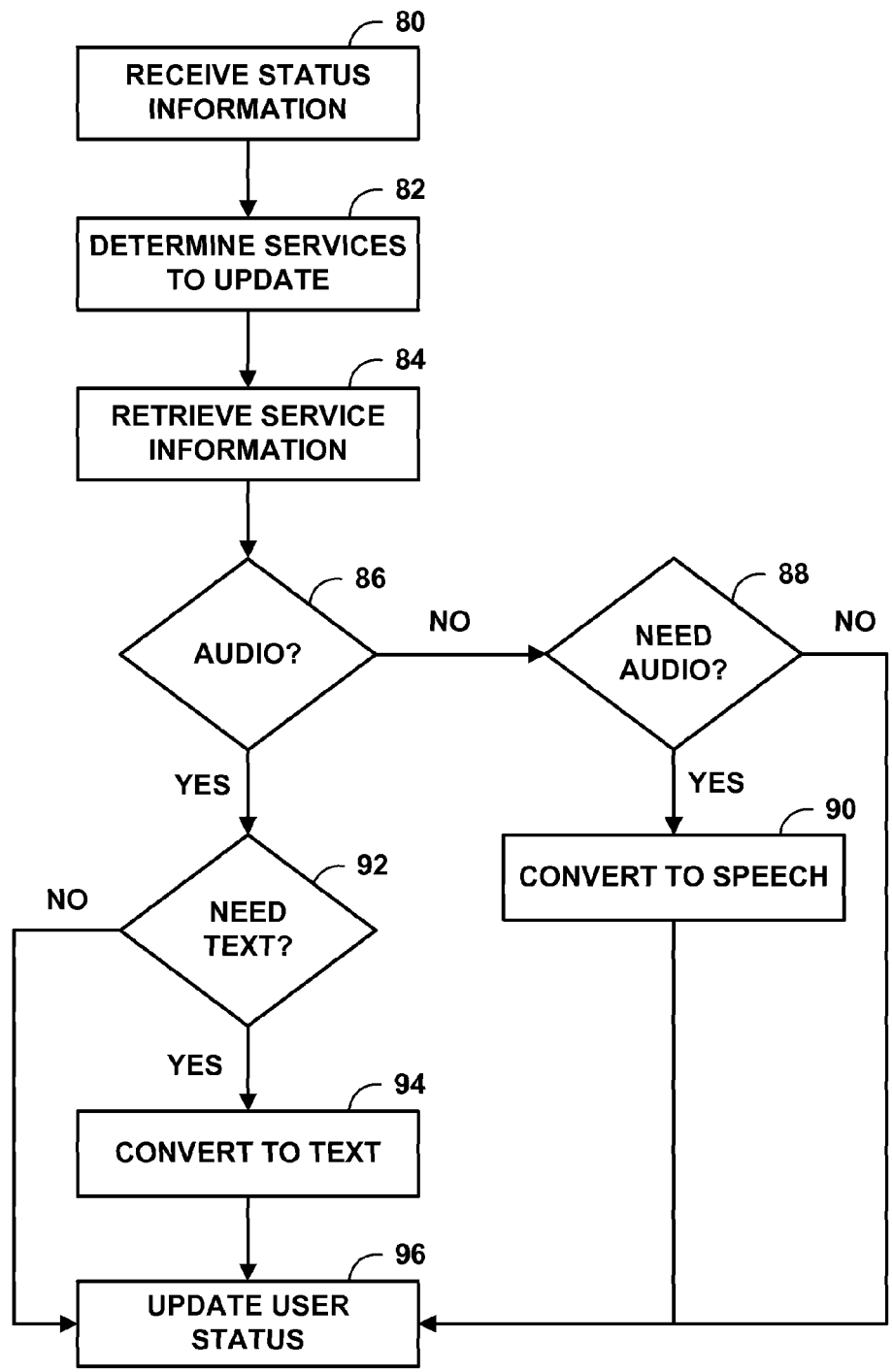
FIG. 4 is a flowchart illustrating an example method for propagating status update information, in accordance with one aspect of the present disclosure.

FIG. 4 is a flowchart illustrating an example method for propagating status update information, in accordance with one aspect of the present disclosure. For purposes of illustration, the example method is described below within the context of the example device 10 of FIG. 2.

In the example method illustrated in FIG. 4, user status propagation module 18 receives status information from user 16 via display 20 and/or user interface 32 (80). The status information may include user status information, duration information, and information about one or more services to which the user status information is to be applied by user status propagation module 18.

After receiving the status information, user status propagation module 18 determines which services were selected by user 16 as requiring the user status information (82). User status propagation module 18 may be configured with information about each specified service, including user account information (e.g., username and password information) and the format of the user status information to update the user status information for each service. After determining which services were selected by user 16, user status propagation module retrieves the relevant information for each service from configuration data 50 (84). For example, if user 16 selects Google Voice™ and Google Chat, user status propagation module may retrieve user account information and format information from configuration data 50.

User status propagation module 18 may then determine whether the received user status information is text or audio (86). If the received user status information is text ("NO" branch of 86), then user status propagation module 18 determines if one or more of the selected services processes the user status information in audio format (88). In the example where user 16 selected Google Voice™ and Google Chat as the two services two update, user status propagation module may determine that Google Voice™ processes an audio version of the user status information in order to update a voicemail greeting ("YES" branch of 88). Because, in this example, the user status information received from user 16 is in a text format and Google Voice™ processes an audio version of the user status information, user status propagation module 18 converts the text version into an audio version using text-to-speech techniques (90).

After converting the text version of the user status information to an audio version, user status propagation module 18 has access to both formats of the user status information and may issue commands to Google Voice™ that include the audio version of the user status information and issue commands to Google Chat that include the text version of the user status information. If user 16 did not select any services that process an audio version of the user status information ("NO" branch of 88), user status propagation module 18 may not convert the text version of the user status information to an audio version.

If the received user status information is in audio format ("YES" branch of 86), user status propagation module 18 determines if one or more of the selected services processes the user status information in text format (92). In the example where user 16 selected Google Voice™ and Google Chat as the two services two update, user status propagation module may determine that Google Chat processes a text version of the user status information ("YES" branch of 88). Because, in this example, the user status information received from user 16 is in an audio format and Google Chat processes a text version of the user status information, user status propagation module 18 converts the audio version into a text version using speech recognition techniques (94). If user 16 did not select any services that require a text version of the user status information ("NO" branch of 92), user status propagation module 18 may not convert the audio version of the user status information to a text version. When user status propagation module 18 has access to the formats of the user status information, user status propagation module 18 may then update the user status information for each of the selected services (96).

If the received user status information is in audio format ("YES" branch of 86), user status propagation module 18 determines if one or more of the selected services requires the user status information in text format (92). In the example where user 16 selected Google Voice™ and Google Chat as the two services to update, user status propagation module 18 may determine that Google Voice™ processes an audio version of the user status information in order to update a voicemail greeting ("YES" branch of 88).

In this manner, the techniques of this disclosure may provide the user with a simplified mechanism for updating various voicemail greet text user status information. In accordance with the techniques of this disclosure, a user may select a desired voicemail greeting from a set of pre-recorded voicemail greetings that may correspond to a particular pre-configured text-based status. The user, in some instances, may also record a custom recorded voicemail greeting, which is converted to a text-based status using speech recognition techniques. The techniques may also provide a single interface for updating and managing voicemail greeting messages and text-based status messages. Thus, the techniques of this disclosure may enable voicemail greeting messages to be as dynamically and easily updated as text-based status update messages.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as RAM, ROM, NVRAM, EEPROM, FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be software and/or firmware executed by processing circuitry including one or more processors, such as one or more digital signal processors (DSPs), general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the invention have been described. These and other embodiments are within the scope of the following claims.

The invention claimed is:

1. A method comprising:
   receiving a voicemail greeting template having a default portion and a placeholder portion, wherein the default portion is included in voicemail greetings generated by a computer based on the voicemail greeting template;

receiving an audio and video status message for a user or a device, wherein the status message includes a state of the user or a state of the device;
extracting an audio portion of the audio and video status message; and
replacing the placeholder portion of the voicemail greeting template with the audio portion of the received status message to generate, with the computer, a personalized voicemail greeting of the user that includes the default portion and the received status information, wherein output of the personalized voicemail greeting is initiated in response to an incoming phone call.

2. The method of claim 1, wherein replacing the placeholder portion of the voicemail greeting template comprises:
replacing a name placeholder sub-portion with a name of the user; and
replacing a state placeholder sub-portion with one of the state of the user or the state of the device.

3. The method of claim 2, wherein at least a part of the default portion of the voicemail greeting template separates the name placeholder sub-portion and the state placeholder sub-portion.

4. The method of claim 1, further comprising:
receiving a text status message;
converting the text status message into an audio status message; and
replacing the placeholder portion of the voicemail greeting template with the audio status message.

5. The method of claim 1, further comprising:
converting the audio portion of the audio and video status message into a text status message.

6. The method of claim 5, further comprising
determining one or more text-based personalized status update messages based on the text status message, wherein each of the one or more text-based personalized status update messages corresponds to a status update service provider, and wherein the status update service provider maintains user status information for a group of users; and
propagating each of the one or more text-based personalized status messages to the corresponding status update service provider.

7. The method of claim 1, further comprising:
determining one or more text-based personalized status update messages based on the audio and video status message, wherein each of the text-based personalized status update messages corresponds to a status update service provider, wherein the status update service provider maintains user status information for a group of users; and
propagating each of the text-based personalized status messages to the corresponding status update service provider.

8. The method of claim 1, further comprising:
receiving the incoming phone call from a caller, wherein caller identification information is associated with the incoming phone call and identifies the caller; and
determining whether the caller is permitted to receive additional information about the user based on the caller identification information;
generating a second personalized voicemail greeting based on the additional information and the personalized voicemail greeting; and
outputting the second personalized voicemail greeting.

9. The method of claim 8, wherein the additional information comprises at least one of the user's geographical location, an indication of when the generated personalized voicemail greeting is configured to expire, and an indication of when the generated personalized voicemail greeting will next include status information indicating the user is available.

10. The method of claim 1, wherein the personalized voicemail greeting automatically reverts to a default voicemail greeting after a configurable period of time.

11. The method of claim 1, further comprising:
receiving the incoming phone call; and
outputting the personalized voicemail greeting; and
outputting a time at which the personal voicemail greeting is configured to automatically revert to a default voicemail greeting.

12. The method of claim 1, further comprising:
receiving status update information from a calendar application, wherein the calendar application generates the status update information based upon events stored in the calendar application.

13. The method of claim 1, wherein the audio and video status message indicates that the user is not available, the method further comprising:
prior to notifying the user of the incoming call, outputting the personalized voicemail greeting in response to receiving the incoming phone call.

14. The method of claim 1, further comprising:
determining one or more personalized audio and video status update messages based on the received audio and video status message, wherein each of the personalized audio and video status update messages corresponds to a status update service provider, wherein the status update service provider maintains user status information for a group of users; and
propagating each of the personalized audio and video status update messages to the corresponding status update service provider.

15. A tangible computer-readable storage medium encoded with instructions for causing one or more programmable processors of a computing device to:
receive a voicemail greeting template having a default portion and a placeholder portion, wherein the default portion is included in voicemail greetings generated based on the voicemail greeting template;
receive audio and video status information for a user or a device, wherein the status information includes a state of the user or a state of the device;
extract an audio portion of the audio and video status information; and
replace the placeholder portion of the voicemail greeting template with the audio portion of the received status information to generate a personalized voicemail greeting of the user that includes the default portion and the received status information, wherein output of the personalized voicemail greeting is initiated in response to an incoming phone call.

16. A computing device comprising:
one or more programmable processors; and
one or more modules operable by the one or more processors to receive a voicemail greeting template having a default portion and a placeholder portion, wherein the default portion is included in voicemail greetings generated based on the voicemail greeting template, receive audio and video status information for a user or a device, extract an audio portion of the audio and video status information, and replace the placeholder portion of the voicemail greeting template with the audio portion of the received status information to generate a personalized voicemail greeting of the user that includes the default portion and the received status information, wherein the status information includes a state of the user or a state of the device, and wherein output of the personalized voicemail greeting is initiated in response to an incoming phone call.

17. A method comprising:

receiving audio and video status update information associated with the computing device or a user of the computing device, wherein the status information includes a state of the computing device or a state of the user;

extracting an audio portion of the audio and video status update information;

determining a voicemail greeting based on the audio portion of the audio and video status update information, wherein output of the voicemail greeting is initiated in response to a missed incoming phone call;

determining one or more personalized text-based status update messages based on the audio and video status update information wherein each of the personalized text-based status update messages corresponds to a status update service provider, wherein the status update service provider maintains user status information for a group of users; and propagating each of the personalized text-based status messages to the corresponding status update service provider.

* * * * *